(12) United States Patent
Dewasurendra

(10) Patent No.: US 10,286,760 B2
(45) Date of Patent: May 14, 2019

(54) AUTOMOTIVE WATER-SHIELD WITH DRIP LEDGE TO PREVENT WATER LEAKS

(71) Applicant: FORD GLOBAL TECHNOLOGIES, LLC, Dearborn, MI (US)

(72) Inventor: Lohitha Dewasurendra, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 22 days.

(21) Appl. No.: 15/383,339

(22) Filed: Dec. 19, 2016

(65) Prior Publication Data

US 2018/0170160 A1      Jun. 21, 2018

(51) Int. Cl.
    *B60J 5/04* (2006.01)

(52) U.S. Cl.
    CPC .................................. *B60J 5/0418* (2013.01)

(58) Field of Classification Search
    CPC . B60J 5/0418; B60R 13/0892; B60R 13/0815
    See application file for complete search history.

(56) References Cited

U.S. PATENT DOCUMENTS

| | | | | |
|---|---|---|---|---|
| 2,111,168 A | * | 3/1938 | Chansor | H01H 35/346 200/83 N |
| 3,778,101 A | | 12/1973 | Tsuda | |
| 4,445,721 A | | 5/1984 | Yaotani et al. | |
| 4,492,405 A | | 1/1985 | Chikaraishi et al. | |
| 4,696,848 A | * | 9/1987 | Jones | B60J 5/0418 427/208.4 |
| 4,865,791 A | * | 9/1989 | Ferro | B29C 53/24 264/134 |
| 4,873,132 A | * | 10/1989 | Jones | B60J 5/0418 428/182 |
| 4,932,315 A | * | 6/1990 | Dixon | B60H 1/248 428/352 |
| 4,957,803 A | * | 9/1990 | Foley | B60R 13/0846 156/293 |
| 4,972,765 A | * | 11/1990 | Dixon | B60H 1/248 137/855 |
| 5,298,694 A | * | 3/1994 | Thompson | B32B 5/26 181/286 |

(Continued)

FOREIGN PATENT DOCUMENTS

| | | |
|---|---|---|
| CN | 202987012 U | 6/2013 |
| DE | 2510721 A1 | 9/1976 |

(Continued)

OTHER PUBLICATIONS

English Machine Translation of CN202987012U.

(Continued)

*Primary Examiner* — Justin B Rephann
(74) *Attorney, Agent, or Firm* — Jason Rogers; Vichit Chea; King & Schickli, PLLC

(57) ABSTRACT

A water-shield includes a flexible body having a drip ledge. That drip ledge is displaceable between a first position and a second position. A door assembly includes a wall and the water-shield. In the second position, the drip ledge extends through an access opening in the wall to divert water away from the dry side of the wall. A related method is also disclosed.

5 Claims, 3 Drawing Sheets

(56) References Cited

U.S. PATENT DOCUMENTS

| | | | | |
|---|---|---|---|---|
| 5,456,513 A * | 10/1995 | Schmidt | B32B 27/20 | 296/39.1 |
| 5,482,343 A * | 1/1996 | Bradac | B60J 5/0418 | 296/146.7 |
| 5,773,375 A * | 6/1998 | Swan | B60J 5/00 | 428/903 |
| 6,045,921 A * | 4/2000 | Restaino | B32B 7/06 | 156/242 |
| 6,412,852 B1 * | 7/2002 | Koa | B60R 13/0206 | 296/146.5 |
| 6,676,195 B1 * | 1/2004 | Marriott | B60B 33/045 | 296/146.1 |
| 6,863,335 B2 * | 3/2005 | Lopez Torres | B60J 5/0455 | 296/146.7 |
| 6,898,901 B2 * | 5/2005 | Petroski | B60J 5/0416 | 296/146.5 |
| 6,995,317 B1 * | 2/2006 | Dzurilla | B60R 16/0222 | 16/2.1 |
| 7,775,581 B2 * | 8/2010 | Kita | B60R 13/08 | 296/146.7 |
| 7,784,851 B2 * | 8/2010 | Filipczak | B60J 5/0418 | 296/146.1 |
| 8,556,332 B2 * | 10/2013 | Nakashima | B60R 13/0243 | 296/146.5 |
| 2005/0210779 A1 * | 9/2005 | Koa | B60J 5/0416 | 52/204.1 |
| 2006/0265963 A1 * | 11/2006 | Winborn | B60J 5/0418 | 49/502 |
| 2007/0046064 A1 * | 3/2007 | Winborn | B60J 5/0418 | 296/146.7 |
| 2007/0102956 A1 * | 5/2007 | Bucholtz | B60J 5/00 | 296/146.7 |
| 2009/0322118 A1 * | 12/2009 | Koa | B60J 5/0418 | 296/146.7 |

FOREIGN PATENT DOCUMENTS

| | | |
|---|---|---|
| DE | 10133420 A1 | 1/2003 |
| JP | S628846 A | 1/1987 |

OTHER PUBLICATIONS

English Machine Translation of DE10133420A1.
English Machine Translation of DE2510721A1.
English Machine Translation of JPS628846A.

* cited by examiner

AUTOMOTIVE WATER-SHIELD WITH DRIP LEDGE TO PREVENT WATER LEAKS

TECHNICAL FIELD

This document relates generally to the motor vehicle equipment field and, more particularly, to a new and improved water-shield, to a motor vehicle door assembly incorporating that water-shield as well as to a related method of installing that water-shield to a wall within that door assembly.

BACKGROUND

Motor vehicle door assemblies typically include an internal partition or wall that separates a "wet side" in the door assembly from a "dry side." Such walls typically contain large access openings that allow the assembly of the door content. These access openings are sealed with large flexible water-shields which are held in place on the wall by butyl adhesive or other appropriate means.

Water tightness is directly dependent on the adhesion of the continuous butyl bead. The assembly process is somewhat difficult and susceptible to operator error in wetting out the butyl bead with proper pressure. Significantly, any resulting leak could lead to costly repairs and adversely impact customer satisfaction.

This document relates to a new and improved water-shield as well as to a motor vehicle door assembly incorporating that new and improved water-shield. Advantageously, the new and improved water-shield includes an integral drip ledge that may be displaced between a first position and a second position. In the first position, the water-shield lends itself to manufacturing without causing a die-lock condition. In the second position, the drip ledge extends through the access opening and at least partially encompasses the margin of the wall defining the bottom portion of the access opening. As a result, the drip ledge functions to effectively divert water away from the adhesive joint between the water-shield and the wall and toward the wet side of the door assembly.

SUMMARY

In accordance with the purposes and benefits described herein, a water-shield is provided. That water-shield comprises a flexible body including a drip ledge. The drip ledge is displaceable between a first position and a second position.

The body may include a lower edge and the drip ledge may extend along that lower edge. The drip ledge may be collapsed and folded-in upon itself when in the first position. Further, the drip ledge may be fully extended when in the second position. In that second position the drip ledge may form a concavity opening toward the lower edge of the body.

In accordance with an additional aspect, a door assembly is provided. That door assembly comprises a wall having a wet side, a dry side and an access opening. Further, the door assembly comprises a water-shield secured to the wall and closing the access opening. That water-shield includes a flexible body having a drip ledge wherein the drip ledge is displaceable between a first position and a second position. More specifically, the body may include a lower edge and the drip ledge may extend along that lower edge. Further, the drip ledge may be collapsed and folded-in upon itself when in the first position. In contrast, the drip ledge may form a concavity opening toward the lower edge of the body when in the second position.

The body may be secured to the dry side of the wall and the drip ledge may extend through the access opening when in the second position. Further, the concavity and the drip ledge may overlie a margin of the wall defining a bottom portion of the access opening. Further, the margin may include a curved lip and the curved lip may at least be partially encompassed within the concavity formed by the drip ledge when the drip ledge is in the second position.

In accordance with yet another aspect, a method is provided of installing a water-shield to a wall within a door assembly. That method may comprise the steps of securing the water-shield to a dry side of the wall overlying an access opening in the partition and flipping a drip ledge of the water-shield from a first position to a second position when the drip ledge extends through the access opening.

The method may further include the step of pushing outwardly on the drip ledge so that the drip ledge is displaced from the first position when the drip ledge is collapsed and folded-in upon itself to the second position wherein the drip ledge forms a concavity overlying a margin of the wall defining a bottom portion of the access opening.

The method may also include the step of inserting one or more fingers into the drip ledge and pushing the drip ledge from the first position into the second position.

Still further, the method may include the step of adhering the water-shield to the dry side of the wall with an appropriate adhesive.

In the following description, there are shown and described several preferred embodiments of the water-shield, the door assembly and the related method of installing a water-shield to a partition or wall within a door assembly. As it should be realized, the water-shield, door assembly and method are capable of other, different embodiments and their several details are capable of modification in various, obvious aspects all without departing from the water-shield, door assembly and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the water-shield, door assembly and related method and together with the description serve to explain certain principles thereof. In the drawing figures.

Reference will now be made in detail to the present preferred embodiments of the water-shield, door assembly and method, examples of which are illustrated in the accompanying drawing figures.

DETAILED DESCRIPTION

Figure 1:
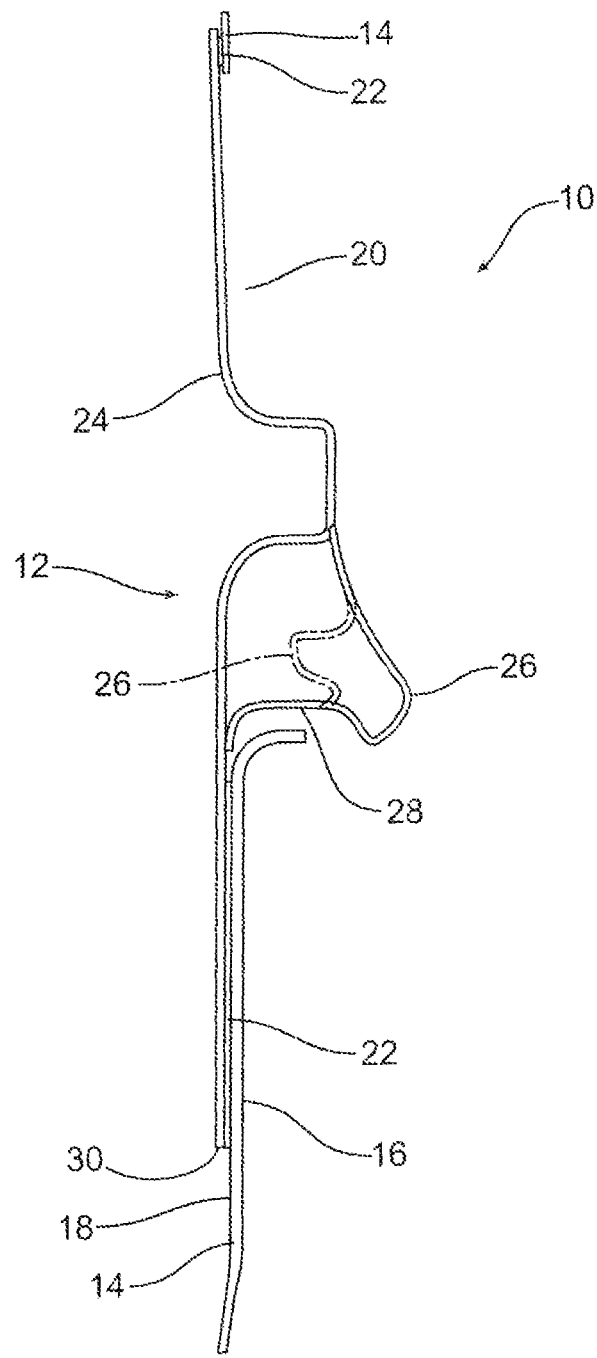
FIG. 1 is a detailed schematic cross-sectional view of the water-shield and door assembly illustrating the drip ledge in a first position in phantom line and in a second position in full line.
Figure 2:
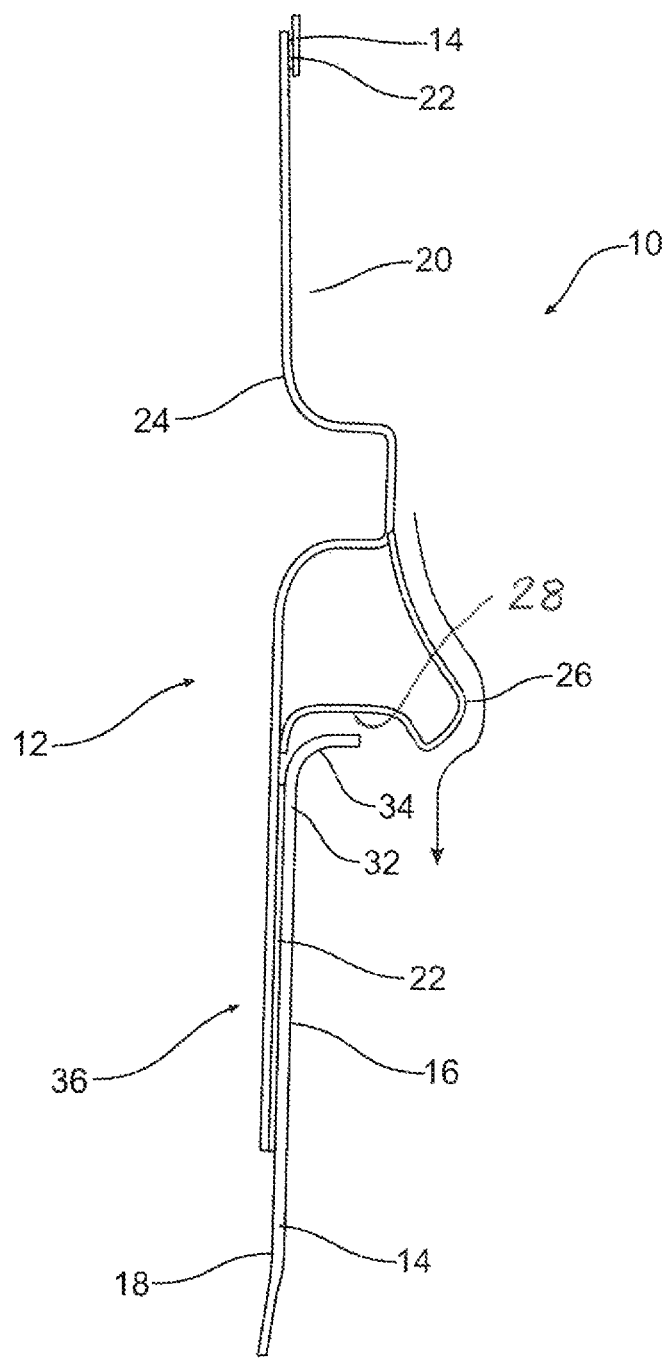
FIG. 2 is a view similar to FIG. 1 illustrating how the drip ledge in the second position defines a concavity partially encompassing the curved lip of the margin of the wall forming the bottom of the access opening so as to divert water away from the adhesive joint between the water-shield and the wall.
Figure 3:
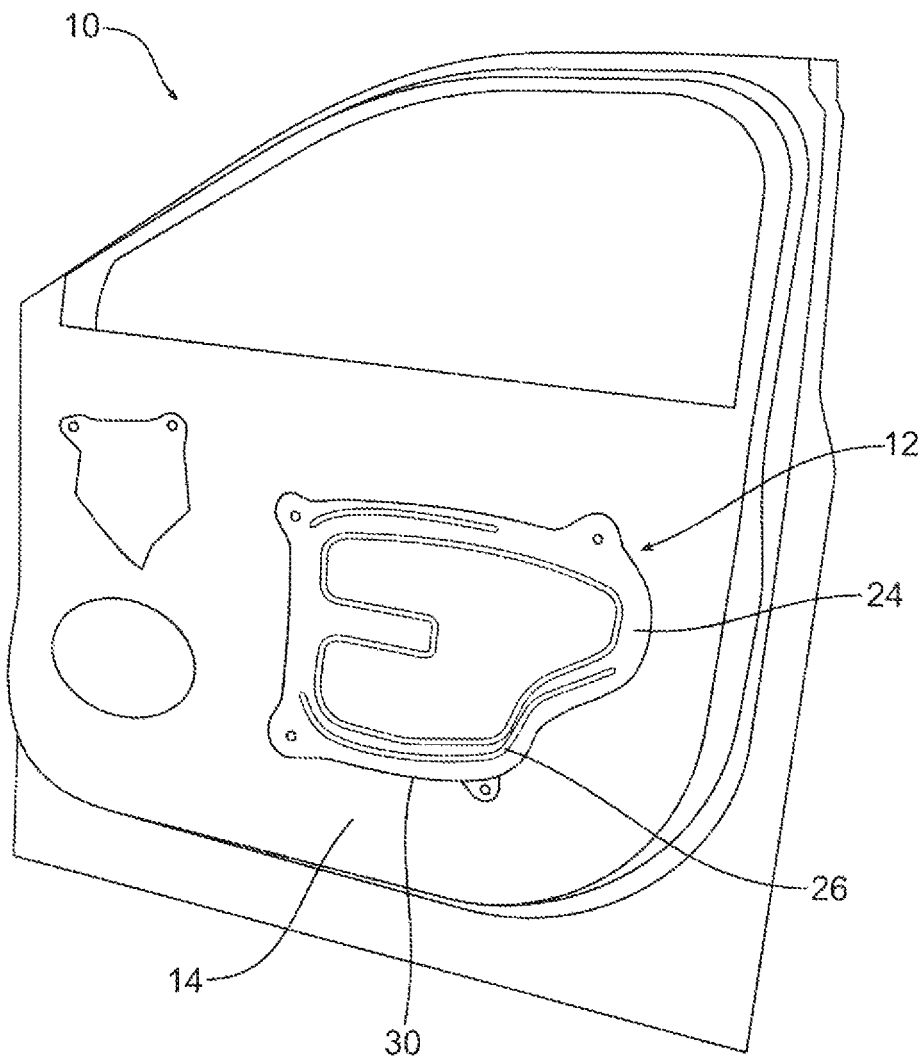
FIG. 3 is a perspective view of the door assembly from the dry side showing the water-shield secured in place to the wall.

Reference is now made to FIGS. 1-3 illustrating a door assembly 10 for a motor vehicle that incorporates the new and improved water-shield 12. The door assembly 10 includes a partition or wall 14 having a wet side 16, a dry side 18 and an access opening 20.

The water-shield 12 is secured to the partition or wall 14 so as to overlie and close the access opening 20. In the illustrated embodiment, the water-shield 12 is secured to the dry side 18 of the wall 14 by means of an appropriate adhesive bead 22 that extends completely around the access opening 20. Appropriate adhesives for this purpose include, but are not necessarily limited to a butyl adhesive, a hot melt adhesive or any other non-hardening sealant that remains tacky without cracking.

The water-shield 12 includes a flexible body 24 made from an appropriate polymer material. Such materials include, but are not limited to polyethylene and rubberized foam. The flexible body 24 includes an integral drip ledge 26 that is displaceable between a first position, illustrated in phantom line in FIG. 1 and a second position illustrated in full line in FIG. 1. More specifically, in the first position, the drip ledge 26 is collapsed and folded-in upon itself. In contrast, in the second position the drip ledge 26 forms a concavity 28 that opens toward the lower edge 30 of the body 24.

As illustrated in FIG. 3, the drip ledge 26 may extend across and along the complete bottom or lower edge 30 of the body 24 in a continuous manner. Such a configuration helps to insure the integrity of the water seal provided by the water-shield 12 along the lower margin of the access opening 20 thereby maintaining the dry side 18 dry by diverting any water running down the water-shield toward the wet side 16.

As best illustrated in FIG. 2, when the water-shield 12 is properly seated and secured to the wall 14 with the drip ledge 26 fully extended in the second position, the drip ledge extends through the access opening 20. Thus, as illustrated, the concavity 28 in the drip ledge 26 overlies the margin 32 of the wall 14 defining the bottom portion of the access opening 20. In the illustrated embodiment, that margin 32 includes a curved lip 34. That curved lip 34 is at least partially encompassed within the concavity 28. Thus, as illustrated by the action arrow in FIG. 2, water is diverted away from the adhesive joint 36 between the wall 14 and the water-shield 12 toward the wet side 16 of the door assembly 10. Thus, the water-shield is particularly effective in preventing water intrusion through the joint 36 to the dry side 18 of the door assembly 10.

Consistent with the above description, a method is provided of installing the water-shield 12 to the wall 14 within the door assembly 10. That method comprises the steps of securing the water-shield 12 to the dry side 18 of the wall 14 overlying the access opening 20 in the wall and flipping the integral drip ledge 26 of the water-shield from the first position to the second position wherein the drip ledge extends through the access opening. The water-shield 12 may be adhered to the dry side 18 of the wall 14 with an appropriate adhesive.

The method may be further described as including the step of pushing outwardly on the drip ledge 26 in the direction of action arrow A so that the drip ledge is displaced from the first position wherein the drip ledge is collapsed and folded-in upon itself to the second position wherein the drip ledge forms the concavity 28 overlying the margin 32 of the wall 14 defining a bottom portion of the access opening 20. This may be done during installation by the installer inserting one or more fingers in the drip ledge 26 and pushing outward to fully extend the drip ledge into the second position.

A number of benefits and advantages are provided by the new and improved water shield 12. The integral drip ledge 26 is designed as a "push-out" feature upon installation into the door assembly 10. This aids the manufacturing process as the water-shield 12 remains open to the die-draw direction without being die-locked. The drip ledge 26 is then easily erected by pushing outward. One or more fingers may be used to complete the operation. There is no need for any tool of any kind.

Advantageously, the provision of the continuous drip ledge 26 along the bottom edge 30 of the water-shield 12 diverts water away from the wall margin 32 and the seal joint 36 toward the wet side 16 of the wall 14. This greatly enhances the robustness of the water-shield 12 against water leaks. Even in the case of improper water-shield installation where the adhesive bead 22 is not properly pressed into the sheet metal wall 14 or skips in the adhesion, water will not penetrate the dry side 18 of the wall 14.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A door assembly, comprising:
    a wall having a wet side, a dry side and an access opening; and
    a water-shield secured by an adhesive bead to said wall and closing said access opening, said water-shield including a flexible body having a continuous drip ledge wherein said drip ledge is displaceable between a first position and a second position;
    said door assembly being characterized by said flexible body including a lower edge and said drip ledge extending along said lower edge wherein said drip ledge in said second position forms a concavity opening toward said lower edge of said flexible body and at least partially encompassing a margin of said wall defining a bottom portion of said access opening.

2. The door assembly of claim 1, wherein said drip ledge is collapsed and folded-in upon itself when in said first position.

3. The door assembly of claim 2, wherein said flexible body is secured to said dry side of said wall and said drip ledge extends through said access opening when in said second position.

4. The door assembly of claim 1, wherein said margin includes a curved lip and said curved lip is at least partially encompassed within said concavity.

5. The door assembly of claim 4, wherein said adhesive bead extends completely around said access opening.

\* \* \* \* \*